(12) United States Patent
Tomii

(10) Patent No.: US 12,050,947 B2
(45) Date of Patent: Jul. 30, 2024

(54) IMAGE FORMING APPARATUS HAVING TEST CHART PRINTING CONTROL

(71) Applicant: CANON KABUSHIKI KAISHA, Tokyo (JP)

(72) Inventor: Hiroshi Tomii, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/540,499

(22) Filed: Dec. 2, 2021

(65) Prior Publication Data

US 2022/0188584 A1 Jun. 16, 2022

(30) Foreign Application Priority Data

Dec. 14, 2020 (JP) ................. 2020-207042

(51) Int. Cl.
*H04N 1/46* (2006.01)
*G03G 15/22* (2006.01)
*G06K 15/02* (2006.01)
*G06K 15/16* (2006.01)
*H04N 1/00* (2006.01)
*H04N 1/10* (2006.01)

(52) U.S. Cl.
CPC .......... *G06K 15/027* (2013.01); *G03G 15/22* (2013.01); *G06K 15/16* (2013.01); *G06K 15/1803* (2013.01); *G06K 15/1872* (2013.01); *H04N 1/00811* (2013.01); *H04N 1/00824* (2013.01); *H04N 1/1061* (2013.01)

(58) Field of Classification Search
None
See application file for complete search history.

(56) References Cited

U.S. PATENT DOCUMENTS

| 7,123,851 | B2 | 10/2006 | Tomita et al. |
| 9,992,366 | B2 | 6/2018 | Osada |
| 10,306,103 | B2 * | 5/2019 | Maeda ................. H04N 1/0032 |

(Continued)

FOREIGN PATENT DOCUMENTS

| JP | H10-329397 A | 12/1998 |
| JP | 2001-177725 A | 6/2001 |

(Continued)

OTHER PUBLICATIONS

Japanese Office Action dated Jun. 18, 2024, in Japanese Patent Application No. 2020-207042.

*Primary Examiner* — Dung D Tran
(74) *Attorney, Agent, or Firm* — VENABLE LLP

(57) ABSTRACT

In an image forming apparatus a controller receives user instruction information for printing a test chart, controls a printer to print the test chart on a sheet regardless of a result of reading mode selection, controls a display to display a screen for selecting a reading mode for reading the test chart among a plurality of reading modes, and controls a conveyance roller and a reading sensor to read the test chart on the sheet while conveying a stacked sheet in a case where a first reading mode is selected on the screen. The controller also controls the reading sensor to read the test chart on the sheet on a platen in a case where a second reading mode is selected on the screen, and controls density of the image to be printed by the printer based on a reading result of the test chart by the reading sensor.

11 Claims, 10 Drawing Sheets

(56) References Cited

U.S. PATENT DOCUMENTS

| | | | |
|---|---|---|---|
| 10,469,687 B2 | 11/2019 | Osada | |
| 10,498,929 B2 | 12/2019 | Tomii | |
| 10,771,645 B2 | 9/2020 | Osada | |
| 11,057,544 B2 | 7/2021 | Hirao | |
| 11,184,497 B2* | 11/2021 | Tomii | H04N 1/0057 |
| 11,272,069 B2 | 3/2022 | Osada | |
| 2004/0156649 A1* | 8/2004 | Asai | G03G 15/6508 399/82 |
| 2008/0225074 A1* | 9/2008 | Van de Wynckel | B41J 19/145 347/19 |
| 2012/0120418 A1* | 5/2012 | Okayama | H04N 1/00708 358/1.2 |
| 2017/0199488 A1* | 7/2017 | Maeda | H04N 1/00039 |
| 2019/0149700 A1* | 5/2019 | Tomii | G03G 15/5062 399/49 |
| 2019/0158682 A1 | 5/2019 | Andersen et al. | |
| 2020/0209796 A1* | 7/2020 | Hidaka | G03G 15/5016 |
| 2020/0358916 A1* | 11/2020 | Tomii | H04N 1/00708 |
| 2020/0366812 A1* | 11/2020 | Hirao | H04N 1/00074 |

FOREIGN PATENT DOCUMENTS

| | | |
|---|---|---|
| JP | 2005-010733 A | 1/2005 |
| JP | 2018-141898 A | 9/2018 |
| JP | 2020-188389 A | 11/2020 |
| WO | 2016/092703 A1 | 6/2016 |

* cited by examiner

IMAGE FORMING APPARATUS HAVING TEST CHART PRINTING CONTROL

BACKGROUND OF THE INVENTION

Field of the Invention

The present disclosure relates to an image forming apparatus having an adjustment function for adjusting a printing condition and a diagnosis function for an image failure.

Description of the Related Art

An electrophotographic image forming apparatus has a function for printing a test chart to perform printing condition adjustment and diagnosis of an image failure, and the like based on a reading result of the test chart by a reading device. Examples of the printing condition include tone correction, density unevenness correction, printing position adjustment, and transfer output adjustment (secondary transfer voltage adjustment). Examples of the image failure include generation of a point or a streaked image. The test chart includes a test image corresponding to contents of adjustment or contents of diagnosis on a sheet.

The tone correction is described as an example of the image quality adjustment with the use of the test chart. Tone characteristics (density characteristics) of an image formed on the sheet by the image forming apparatus fluctuate due to a variation of a variety of factors. For example, the tone characteristics fluctuate due to a change of an environmental condition such as an air temperature and humidity at an installed place of the image forming apparatus, and due to a temporal change of a component of the image forming apparatus. Therefore, the image forming apparatus executes calibration for maintaining the tone characteristics. In the calibration, first, a test image is formed on the sheet, and a test chart for the tone correction is printed. The image forming apparatus reads the printed test chart with the reading device, to thereby obtain an image density of the test image. The image forming apparatus creates a correction table for enabling the obtained image density to become a target density. At the time of image formation, the tone correction is carried out with the use of this correction table. The correction table is prepared for each sheet type (a basis weight, as to whether the sheet is coated, and as to whether the sheet is recycled paper).

U.S. Pat. No. 10,498,929 B2 describes methods performed by a reading device of an image forming apparatus, i.e., "ADF reading" in which an image is read from a test chart using an automatic document feeder (ADF), and "platen reading" in which an image is read from the test chart placed on a platen. The image forming apparatus of U.S. Pat. No. 10,498,929 B2 selects whether to perform "ADF reading" or "platen reading" before receiving an instruction to print the test chart from a user. Therefore, the user cannot select a reading method for reading the test chart after instructing printing of the test chart.

SUMMARY OF THE INVENTION

An image forming apparatus of the present disclosure includes: a printer configured to print an image, a reading unit having: a platen on which a document is to be placed; and a reading sensor configured to read an image of the document placed on the platen, a document feeder rotatably supported by the reading unit having: a stacking tray on which a document is to be stacked; a conveyance unit configured to convey the document stacked on the stacking tray to cause the reading sensor to read an image of the document; and a discharge tray on which the document conveyed by the conveyance unit is discharged, a display, a controller configured to: receive user instruction information for instructing to print the test chart; control the printer to print the test chart on a sheet in a case where the user instruction information is received; display a screen for selecting a reading mode for reading the test chart among a plurality of reading modes after the user instruction information is received; control the conveyance unit and the reading sensor to read the test chart on the sheet while conveying the sheet stacked on the stacking tray in a case where a first reading mode, which is included in the plurality of reading modes, is selected on the screen; control the reading sensor to read the test chart on the sheet on the platen in a case where a second reading mode, which is included in the plurality of reading modes, is selected on the screen; and control density of the image to be printed by the printer based on a reading result of the test chart by the reading sensor.

Further features of the present disclosure will become apparent from the following description of exemplary embodiments (with reference to the attached drawings).

DESCRIPTION OF THE EMBODIMENTS

Now, at least one embodiment of the present disclosure is described with reference to the accompanying drawings.

Configuration of Image Forming Apparatus

Figure 1:
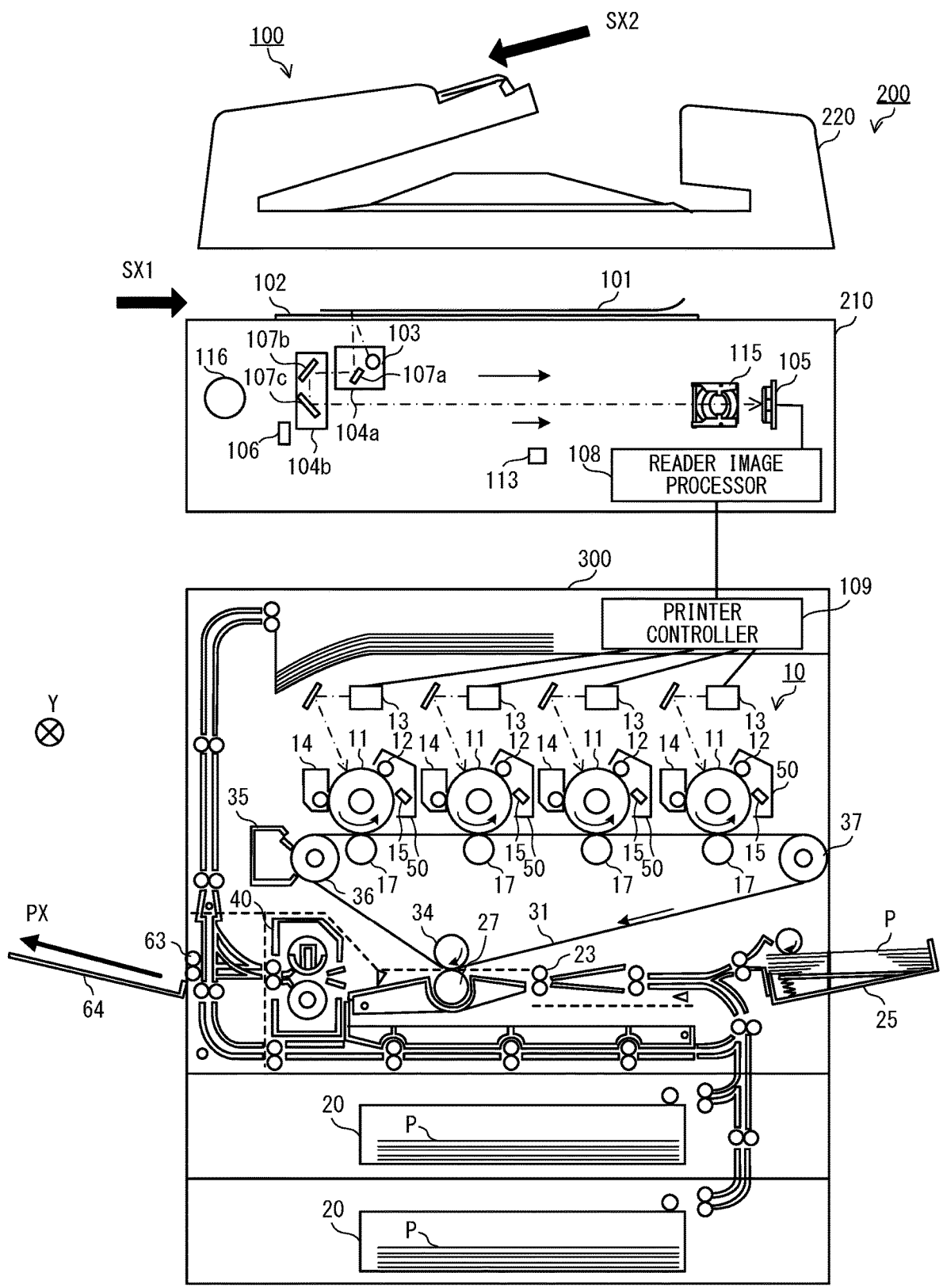
FIG. 1 is a configuration diagram of an image forming apparatus.

FIG. 1 is a configuration diagram of an image forming apparatus of the present embodiment of the present disclosure. An image forming apparatus 100 includes a reader 200, which is a reading device configured to read an image from an original, and a printer 300 configured to form the image on a sheet P. The reader 200 includes a document scanner 210 and an automatic document feeder (ADF) 220. The document scanner 210 is provided on the printer 300, and the ADF 220 is provided on the document scanner 210. The reader 200 reads an image printed on an original 101, and transmits an image signal, which represents the read image, to the printer 300. The printer 300 can perform printing processing (image formation processing) for the sheet P based on the image signal obtained from the reader 200.

In FIG. 1, a direction of conveyance of the sheet by the printer 300 is defined as a PX-direction, and a direction perpendicular to the PX-direction is defined as a Y-direction. Moreover, a direction of paper feeding by the ADF 220 is defined as an SX2-direction, and a moving direction of a first mirror unit 104a and a second mirror unit 104b included in the document scanner 210 is defined as an SX1-direction.

The reader 200 is configured to read an image of an original fed by the ADF 220. And the reader 200 reads an image of the original 101 placed on a platen 102, which is provided on a side of the document scanner 210 that faces the ADF 220. The document scanner 210 includes therein an image sensor 105 and a reader image processor 108. The reader image processor 108 is configured to convert an electric signal that is generated by the image sensor 105 by reading the original 101 into an image signal, and transmit the image signal to the printer 300.

The printer 300 includes therein a printer controller 109. The printer controller 109 obtains the image signal from the reader image processor 108 of the document scanner 210. The printer controller 109 controls the processing of forming the image on the sheet P based on the obtained image signal. The printer 300 includes an image forming unit 10, which is an electrophotographic image forming engine configured to generate an image based on the image signal. The image forming unit 10 includes four units in order to generate an image in a yellow (Y) color, an image in a magenta (M) color, an image in a cyan (C) color, and an image in a black (K) color. The printer 300 includes an intermediate transfer belt 31 and a fixing device 40. The printer 300 is also applicable to monochromatic printing by using the black unit alone.

As illustrated in FIG. 1, the image forming unit 10 includes four photosensitive drums 11, which correspond to the yellow color, the magenta color, the cyan color, and the black color from the left in the stated order. A roller-shaped charger 12, an exposure device 13, a developing device 14, a primary transfer device 17, a drum cleaner 15, and others are arranged around each of the photosensitive drums 11. Steps of forming a toner image in black as a representative of the four colors are described below. The same steps apply to the forming of toner images in other colors.

In a case where image forming is started, the relevant photosensitive drum 11 rotates in the direction of the arrow. The charger 12 evenly charges the surface of the photosensitive drum 11. The exposure device 13 exposes the surface of the photosensitive drum 11 to laser light modulated in accordance with image data that is obtained from the printer controller 109 to form an electrostatic latent image. The developing device 14 develops the electrostatic latent image with a toner adhered thereto, to form a toner image. The primary transfer device 17 performs primary transfer in which the toner image carried on the photosensitive drum 11 is transferred onto the intermediate transfer belt 31. The drum cleaner 15 removes the toner remaining on the photosensitive drum 11 after the primary transfer. This brings the photosensitive drum 11 to a state ready for the forming of the next image. The drum cleaner 15 in the present embodiment is configured so that a cleaning blade made of an elastic material is in contact with the surface of the photosensitive drum 1.

The exposure device 13 scans the surface of the photosensitive drum 11 with the laser light in the Y-direction. The Y-direction is accordingly a main scanning direction in a case where the printer 300 forms an image. The main scanning direction of the reader 200 is the Y-direction, which is the same as the main scanning direction of the printer 300.

The intermediate transfer belt 31 is suspended around three rollers, namely, rollers 34, 36, and 37, and rotates clockwise in FIG. 1. The intermediate transfer belt 31 is an image bearing member configured to bear toner images transferred from the photosensitive drums 11 and convey the toner images toward the roller 34 by rotation. Toner images of the four colors are transferred onto the intermediate transfer belt 31 from the photosensitive drums 11 of the four colors in a superimposed manner, to thereby form a full-color toner image. The roller 34 forms a secondary transfer portion together with a secondary transfer device 27, which is placed across the intermediate transfer belt 31 from the roller 34. A transfer cleaner 35 is provided across the intermediate transfer belt 31 from the roller 36.

A sheet P is fed from a sheet feeding cassette 20 or a manual feed tray 25. When fed from the sheet feeding cassette 20 or the manual feed tray 25, the sheet P is conveyed on a conveying path to a registration roller pair 23. The registration roller pair 23 temporarily stops the conveyed sheet P to correct skew feeding of the sheet P with respect to the conveying direction. The registration roller pair 23 sends the sheet P to the secondary transfer portion in time with the conveyance of the toner image born on the intermediate transfer belt 31 to the secondary transfer portion. The secondary transfer device 27 transfers the toner image on the intermediate transfer belt 31 to the sheet P (secondary transfer). The transfer cleaner 35 removes the toners remaining on the intermediate transfer belt 31. This brings the intermediate transfer belt 31 to a state ready for the forming of the next image.

The sheet P having the toner image transferred thereto is conveyed to the fixing device 40 by the secondary transfer device 27. The fixing device 40 fixes the toner image to the sheet P. For example, the fixing device 40 heats and melts the toner image and applies pressure thereto to fix the toner image to the sheet P. An image is thus formed on the sheet P. The sheet P having the image formed thereon is discharged to a discharge tray 64 by discharge rollers 63.

Document Scanner

Figure 2A:
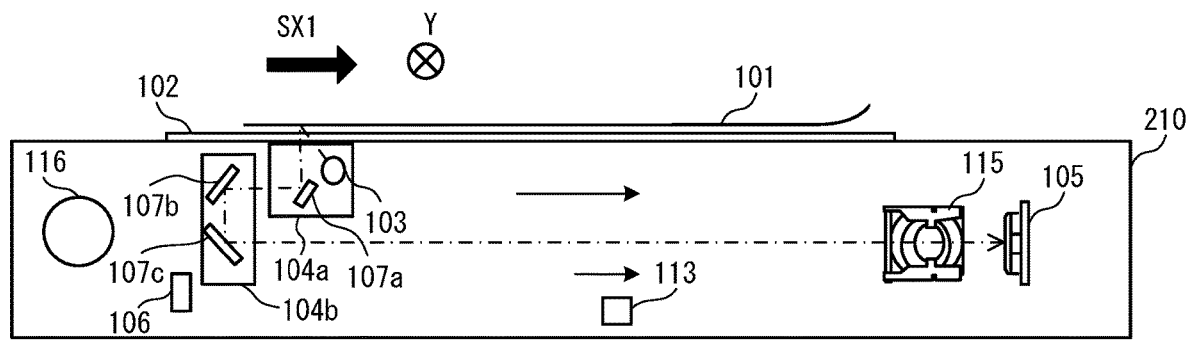
FIG. 2A and FIG. 2B are explanatory diagrams of a document scanner.
Figure 2B:
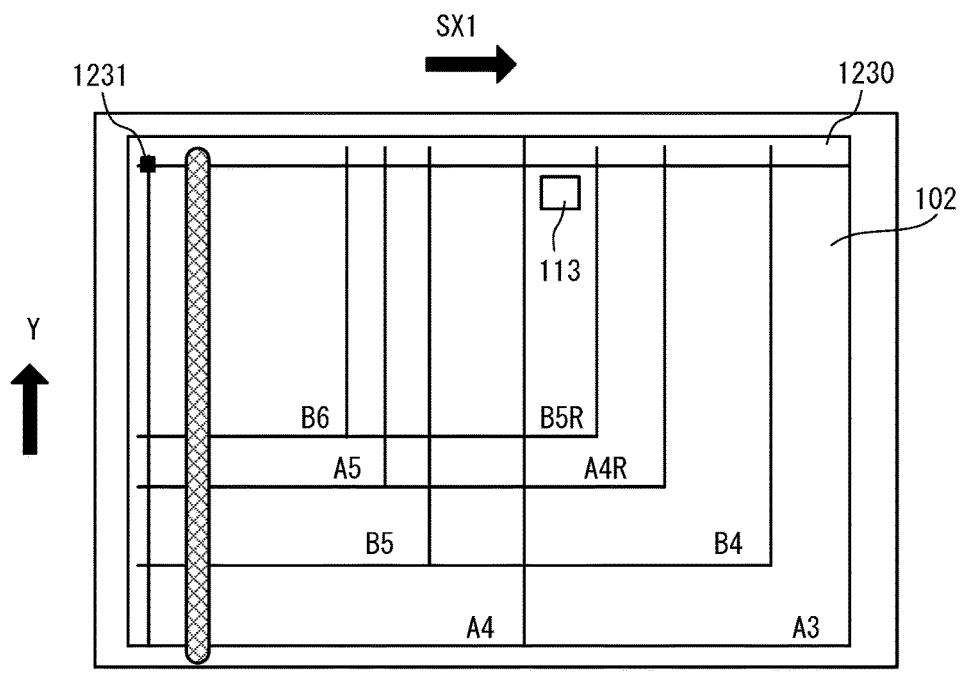

FIG. 2A and FIG. 2B are explanatory diagrams of the document scanner 210. In FIG. 2A, a configuration of the document scanner 210 is illustrated. FIG. 2B is a diagram of the document scanner 210 when viewed from the ADF 220. In a housing of the document scanner 210, the document scanner 210 includes the first mirror unit 104a, the second mirror unit 104b, an image sensor 105, a lens 115, a motor 116, an original size detection sensor 113, and a home position sensor 106. The first mirror unit 104a includes an original lighting lamp 103 and a first mirror 107a. The second mirror unit 104b includes a second mirror 107b and a third mirror 107c. The first mirror unit 104a and the second mirror unit 104b are movable in the SX1-direction by being driven by the motor 116.

The document scanner 210 can perform image reading in accordance with a first reading mode of reading the original 101 to be conveyed by the ADF 220 and a second reading mode of reading the original 101 placed on the platen 102. In the first reading mode, "ADF reading" is performed, and in the second reading mode, "platen reading" is performed.

The first reading mode includes two types of reading systems which are a sheet-through system and an original fixing system. In the sheet-through system, through the rotation of the motor 116, the first mirror unit 104a and the second mirror unit 104b move to a flow reading position and stop. The flow reading position is a reading position at the time of reading the image from the original 101 that is being conveyed by the ADF 220. The image sensor 105 reads the image of the original 101 during a period in which the ADF 220 is conveying the original 101 on the platen 102. The first mirror unit 104a and the second mirror unit 104b remain halted at the reading position during the reading of the image.

The document scanner 210 turns on the original lighting lamp 103, and applies light to a reading surface (surface on which an image is printed) of the original 101. The first mirror 107a, the second mirror 107b, and the third mirror 107c deflect reflected light (image light) of the light applied to and reflected by the original 101 and guide the polarized light to the lens 115. The lens 115 forms an image from the image light onto a light receiving surface of the image sensor 105. The image sensor 105 converts the image light into an electrical signal. The reader image processor 108 obtains the electrical signal from the image sensor 105 to generate an image signal. At the time of reading the image, the first mirror unit 104a, the second mirror unit 104b, the image sensor 105, and the reader image processor 108 operate as described above. Those operations at the time of reading are the same regardless of the reading modes and the reading systems.

In the original fixing system, the ADF 220 conveys the original 101 onto the platen 102 and stops the original 101 at a predetermined position on the platen 102. The first mirror unit 104a and the second mirror unit 104b read the image of the original 101 while moving in the SX1-direction by the motor 116. After reading the image, the ADF 220 resumes the conveyance of the original 101 and discharges the original 101.

At the time of the second reading mode, through the rotation of the motor 116, the first mirror unit 104a and the second mirror unit 104b move temporarily to a home position, at which the home position sensor 106 is present. On the platen 102, one original is placed with a reading surface thereof directed to the platen 102 and is positionally fixed by the ADF 220 to be placed. The document scanner 210 turns on the original lighting lamp 103 and applies light to the reading surface of the original 101. While moving in the SX1-direction, the first mirror unit 104a and the second mirror unit 104b deflect the image light from the original 101 by the first mirror 107a, the second mirror 107b, and the third mirror 107c, and guide the image light to the lens 115. The lens 115 forms an image from the image light onto the light receiving surface of the image sensor 105. The image sensor 105 converts the image light into an electrical signal. The reader image processor 108 obtains the electrical signal from the image sensor 105, and generates the image signal.

The document scanner 210 can detect the size (original size) of the original 101. The document scanner 210 in the present embodiment detects the original size before reading such an original image. First, the document scanner 210 irradiates an end portion of the original 101 by the original lighting lamp 103, and reads the reflected light from the original 101 by the image sensor 105. The image sensor 105 is a line sensor in which, for example, a plurality of photoelectric conversion elements are arrayed in the Y-direction. The image sensor 105 reads a predetermined number of lines. A direction of the lines is perpendicular to the SX1-direction. A width (length in the Y-direction) of the original 101 is obtained based on a result (electrical signal) of reading the predetermined number of lines by the image sensor 105. The Y-direction is the main scanning direction in a case where the reader 200 reads an image because the image sensor 105 is configured so that a plurality of photoelectric conversion elements are arrayed in the Y-direction. The SX1 direction is a sub-scanning direction orthogonal to the main scanning direction when the reader 200 reads an image.

Moreover, the length (length in the SX1-direction) of the original 101 is detected based on a detection result of the original size detection sensor 113. At least one original size detection sensor 113 is disposed at a predetermined position in the SX1-direction in the housing of the document scanner 210, and detects whether or not the original 101 on the platen 102 is present at the predetermined position. The original size detection sensor 113 is, for example, an infrared sensor, and is capable of outputting as to whether or not the original 101 is present in a binary manner. From a detection result of the original size detection sensor 113, it can be determined whether or not the original 101 exceeds the position of the original size detection sensor 113 in terms of length. In a case where the length of the original 101 is desired to be detected accurately, a plurality of original size detection sensors 113 are disposed.

On the basis of the width and length of the original 101, which are detected as described above, it is determined to which of a plurality of predetermined fixed sizes the size of the original 101 corresponds. Moreover, on the basis of the width and length of the original 101, it is also determined in which orientation (longitudinal reading or lateral reading) the original 101 is placed on the platen 102.

As illustrated in FIG. 2B, the platen 102 has an original size label 1230 disposed on an outer periphery thereof and is provided with an original registration mark 1231 at a reference abutment portion on a back side in the Y-direction. The original 101 is placed so that a vertex thereof is allowed to abut against the original registration mark 1231. The original registration mark 1231 serves as a reference of originals having fixed sizes. The original size detection sensor 113 in the present embodiment is disposed on the back side in the Y-direction of the platen 102 at a position a little more distant than a length of an original having the A4 size from the original registration mark 1231. Therefore, the original size detection sensor 113 cannot detect originals 101 having the A4, B5, A5, and B6 sizes, and can detect originals 101 having the A3, B4, A4R, and B5R size.

ADF

Figure 3A:
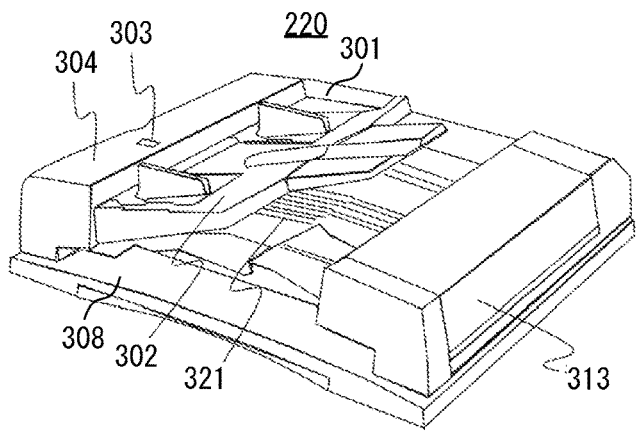
FIG. 3A, FIG. 3B, FIG. 3C, and FIG. 3D are explanatory diagrams of an ADF.
Figure 3B:
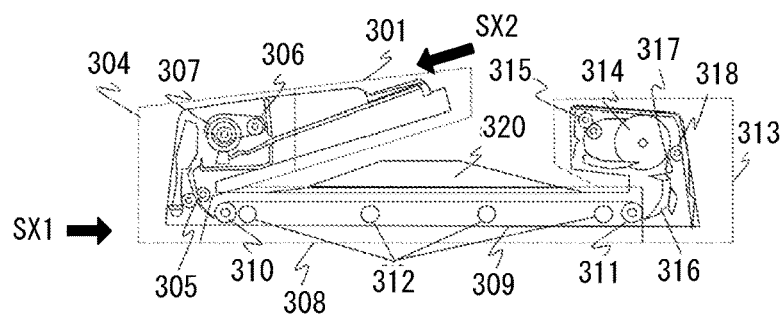
Figure 3C:
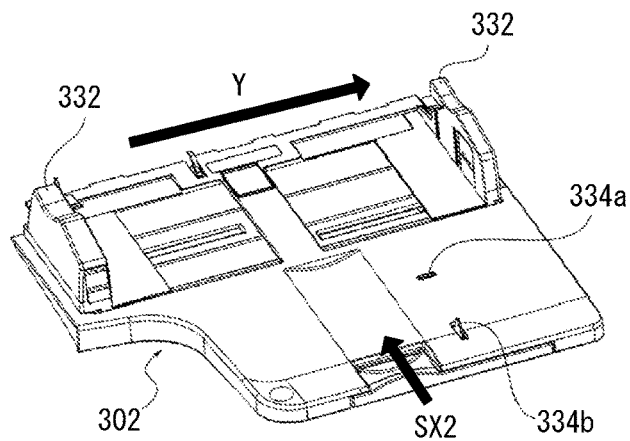
Figure 3D:
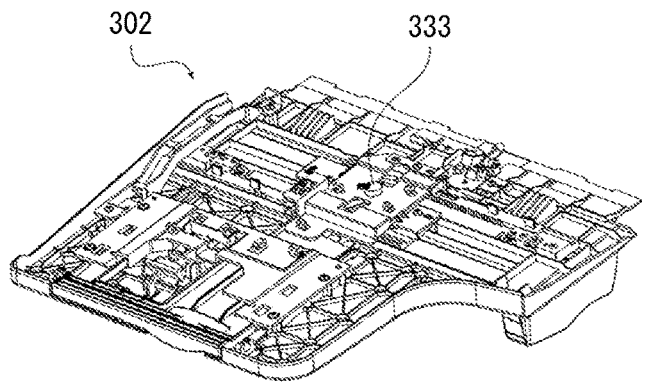

FIG. 3A to FIG. 3D are explanatory diagrams of the ADF 220. FIG. 3A is an exterior appearance perspective view of the ADF 220. FIG. 3B is an internal configuration diagram of the ADF 220. FIG. 3C is a view of an original stacker 301 to be described later when viewed from obliquely above. FIG. 3D is an internal configuration diagram of the original stacker 301 to be described later. The ADF 220 includes the original stacker 301, an original feeder 304, an original conveyor 308, and a reverse discharge portion 313.

The original stacker 301 includes an original tray 302. On the original tray 302, one or more originals 101 can be stacked on a stacking surface thereof. The original tray 302 functions as a feeder. The original stacker 301 is provided with an original indicator 303 configured to turn on in a case where the originals 101 are stacked on the original tray 302. The originals 101 stacked on the original tray 302 are conveyed one by one onto the platen 102 by the original feeder 304, pass on the platen 102, and are discharged to a discharge tray 321 by the reverse discharge portion 313.

In the original feeder 304, a pickup roller 306, a feed roller 307, and a registration roller pair 305 are provided along a conveying path of the originals 101. The pickup roller 306 is a roller that is rotatable and vertically movable.

At the time of feeding the originals 101, the pickup roller 306 is lowered on an uppermost original 101 of an original bundle stacked on the original tray 302 to be brought into contact with this original 101, and conveys this original 101. The feed roller 307 conveys such originals 101, which are conveyed by the pickup roller 306, to the registration roller pair 305. The originals 101 are fed one by one by the pickup roller 306 and the feed roller 307. The registration roller pair 305 is stopped at the time when a tip end of each original 101 reaches the registration roller pair 305. This is in order to correct skew feeding of the original 101. The registration roller pair 305 starts to rotate after correcting the skew feeding and conveys the original 101 to the original conveyor 308.

The original conveyor 308 includes a conveyor belt 309, a drive roller 310, a driven roller 311, and a plurality of pressing rollers 312. The original conveyor 308 conveys the original 101 in the SX1-direction with the use of the conveyor belt 309. The conveyor belt 309 is tensioned around the drive roller 310 and the driven roller 311. Moreover, the conveyor belt 309 is pressed against the platen 102 by the pressing rollers 312. By frictional force, the conveyor belt 309 conveys the original 101 that enters between the conveyor belt 309 and the platen 102. Thus, the original 101 is conveyed on the platen 102.

In the original fixing system of the first reading mode, the conveyor belt 309 stops in a case where the original 101 reaches the reading position. After the original 101 is read by the first mirror unit 104a and the second mirror unit 104b, the conveyor belt 309 conveys the original 101 to the reverse discharge portion 313. In this case, the first mirror unit 104a and the second mirror unit 104b read the stopped original 101 while moving in the SX1-direction.

In the sheet-through system of the first reading mode, the conveyor belt 309 does not stop even when the original 101 reaches the reading position and continues to convey the original 101. In this case, while continuing to stop, the first mirror unit 104a and the second mirror unit 104b read the original 101 that is being conveyed. That is, scanning of the original 101 is performed by the movement of the original 101 in place of the first mirror unit 104a and the second mirror unit 104b.

The reverse discharge portion 313 includes a reverse roller 314, a conveyor roller pair 315, a reverse flapper 316, a discharge flapper 317, and a reverse roller 318. The reverse discharge portion 313 reverses the front and back of the original 101 conveyed from the original conveyor 308 and discharges the original 101 to the discharge tray 321 of a discharged sheet stacking portion 320.

At the time of entering the reverse discharge portion 313, the original 101 conveyed by the conveyor belt 309 of the original conveyor 308 is lifted by the reverse flapper 316 and is conveyed to the reverse roller 314. The original 101 is sandwiched between the reverse roller 314 that rotates counterclockwise (CCW) and the reverse roller 318 that faces the reverse roller 314, and is conveyed to the conveyor roller pair 315. In a case where a rear end of the original 101 passes through the discharge flapper 317, the discharge flapper 317 rotates clockwise (CW). Moreover, the reverse roller 314 also rotates clockwise (CW). Thus, the original 101 is conveyed in a switchback manner, and is discharged to the discharge tray 321 of the discharged sheet stacking portion 320.

In a case where an image on a back side of the original 101 is to be read with the use of the ADF 220, the original 101 is reversed after being scanned on a front side, and the back side is subsequently scanned. This reading system is referred to as "double-side reversal reading." For example, after the front side of the original 101 is scanned, the original 101 is conveyed from the original conveyor 308 to the reverse discharge portion 313, at which the front side and the back side of the original 101 are reversed. The reverse discharge portion 313 rotates the reverse roller 314 counterclockwise (CCW) with a part of the original 101 discharged to the discharge tray 321 through the same operation as the one executed in discharging. The original 101 thus enters the original conveyor 308 from the reverse discharge portion 313 with the front side and the back side reversed, to be scanned on the back side.

The ADF 220 may have a configuration including a reading unit that faces the document scanner 210 across the conveying path of the original 101. The reading sensor includes a light source configured to irradiate the original 101 with light and a reading sensor configured to generate image signal by receiving reflected light that is reflected by the original 101. With this configuration, the front side of the original 101 is read by the document scanner 210 and the back side of the original 101 is read by the reading unit. The operation of reversing the original 101 by the reverse discharge portion 313 is not required in this case. This system of simultaneously scanning the front side and the back side of the original 101 during flow reading is referred to as "double-side simultaneous reading."

Detection of Original Size by ADF

As illustrated in FIG. 3C, on the original tray 302 of the original stacker 301, a pair of regulating members 332 slidable in a width direction (Y-direction) of the original 101 are provided. The regulating members 332 have a function of aligning the position of the original 101 in the width direction at the time of feeding the original 101, which is placed on the original stacker 301 (original tray 302), by regulating both end portions of the original 101 in the width direction. The pair of regulating members 332 is movable symmetrically to each other with respect to the width direction of the original 101. The regulating members 332 regulate the position of the original so that the center of the original 101 in the width direction, which is to be fed, is matched with a feeding center.

The original stacker 301 is provided with an original width sensor 333 capable of detecting the positions of the regulating members 332 (FIG. 3D). The original width sensor 333 detects a size of the original 101 in the width direction, which is placed on the original tray 302, by detecting a position of each regulating member 332 of the pair of regulating members 332 which move in accordance with the width of the original 101.

On the original stacker 301, a plurality (two in the present embodiment) of original length detection sensors 334a and 334b are arranged side by side in a feeding direction (SX2-direction) of the original. The original length detection sensors 334a and 334b detect whether or not the original 101 is present on the original stacker 301 (original tray 302). A size of the original 101 in such an original feeding direction (SX2-direction) of the original 101 is detected based on a detection result of each of the original length detection sensors 334a and 334b.

The size and orientation (whether the original is longitudinally fed or laterally fed) of the original placed on the original stacker 301 are detectable based on such detection results of the original width sensor 333 and the original length detection sensors 334a and 334b.

Printer Controller

Figure 4:
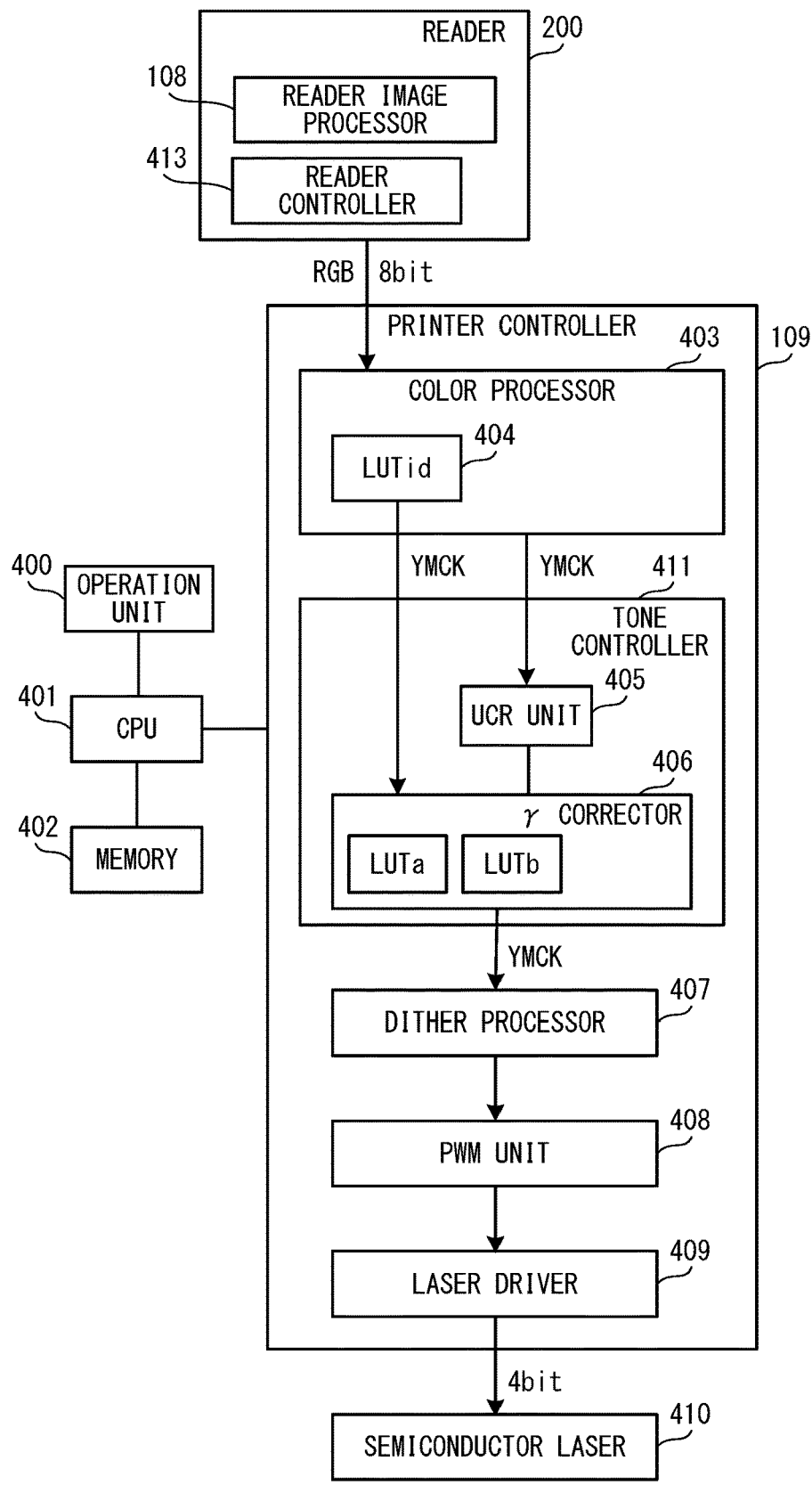
FIG. 4 is an explanatory diagram of a printer controller.

FIG. 4 is an explanatory diagram of the printer controller 109. The following components are connected to the printer controller 109: a central processing unit (CPU) 401 configured to integrally control operations of the image forming apparatus 100; the reader 200; and a semiconductor laser 410. The following components are connected to the CPU 401: a memory 402; and an operation unit 400. The memory 402 includes a read only memory (ROM) and a random access memory (RAM), and stores a control program for controlling the operations of the image forming apparatus 100 and a variety of pieces of data. The CPU 401 executes the control program stored in the memory 402, to thereby control the operations of the image forming apparatus 100. The operation unit 400 is a user interface including an input device and an output device. The input device includes a touch panel, and key buttons such as a start key, a stop key, and a numeric keypad. The output device includes a display and a speaker. The reader 200 includes a reader controller 413 as well as the reader image processor 108 described above. The reader controller 413 is configured to control the operations of each member included in the reader 200. The reader controller 413 controls the original size detection process by the document scanner 210 and the original size detection process by the ADF 220. The reader controller 413 notifies the CPU 401 of the detected original size.

The printer controller 109 includes a color processor 403, a tone controller 411, a dither processor 407, a pulse width modulation (PWM) unit 408, and a laser driver 409. The printer controller 109 converts respective imaged signals of green (G), red (R), and blue (B) into PWM signals, and performs light emission control for the semiconductor laser 410 based on the PWM signals. The semiconductor laser 410 is provided inside the exposure device 13, and is configured to emit laser light with which the photosensitive drums 11 are irradiated.

The image data output from the reader image processor 108 of the reader 200 is input to the color processor 403. The color processor 403 performs image processing and color processing on the input image signal so that a desired output result (image) can be obtained in a case where the printer 300 has an ideal output characteristic. The color processor 403 increases the number of tone levels of the image signal to 10 bits from 8 bits in order to improve the accuracy. The color processor 403 includes an LUTid 404 being a look-up table. The LUTid 404 is a luminance-density conversion table for converting luminance information included in the image signal into density information. The color processor 403 uses the LUTid 404 to convert luminance information of each piece of image signal of R, G, and B into density information of each piece of image signal of Y, M, and C. The image signals of Y, M, and C are input to the tone controller 411.

The tone controller 411 corrects tone characteristics of the image signal, which are obtained from the color processor 403, with the use of correction conditions corresponding to a type of a sheet on which the image is to be formed. For this purpose, the tone controller 411 includes an under color removal (UCR) unit 405 and a γ corrector 406 including an LUTa and an LUTb being a lookup table. The tone controller 411 corrects the tone of each image signal of Y, M, C, and K so that a desired output result (image) can be obtained in accordance with the actual output characteristic of the printer 300. The UCR unit 405 regulates the integrated value (total sum) of the image signal in each pixel to limit the total sum of the image signal levels to a regulation value or less. In a case where the total sum exceeds the regulation value, the UCR unit 405 performs under color removal (UCR) processing of replacing a predetermined amount of C, M, and Y image signal into K image signal, to thereby reduce the total sum of the image signal levels.

The γ corrector 406 is configured to correct, with the use of the LUTa and LUTb, density characteristics (γ characteristics) of the image signal. Each of the LUTa and LUTb is a 10-bit conversion table (tonce correction conditions) for correcting the density characteristics. The LUTa is a correction conversion table for a small number-of-line screen applied to a printing process. The LUTb is a correction conversion table for a large number-of-line screen applied to the copy process. With the printer 300, tone characteristics of an image to be formed on the sheet vary depending on environmental variations and wearing of components. The tone characteristics of the image also vary depending on the type of the sheet. The CPU 401 updates the LUTa and the LUTb by executing tone correction, and maintains the tone characteristics of the image at predetermined tone characteristics. The printer 300 forms the image on the sheet P in accordance with the image signal corrected by the γ corrector 406. The memory 402 may hold the LUTa for each type of the sheet. The CPU 401 reads the LUTa and the LUTb corresponding to the type of the sheet, which is designated by the operation unit 400, from the memory 402, and sets the LUTa and the LUTb to the γ corrector 406. The LUTa and the LUTb are used at the time of copying the original and forming the image in accordance with a print job from a host computer but are not used at the time of executing the tone correction. The image signals of Y, M, C, and K after the tone correction are each input to the dither processor 407.

The dither processor 407 performs dither processing (halftone processing) on the 10-bit image signal of Y, M, C, and K subjected to tone correction, to thereby convert the respective pieces of 10-bit image signal of Y, M, C, and K into 4-bit signals. The PWM unit 408 performs pulse width modulation on the signals subjected to dither processing to generate the PWM signal corresponding to the control signal for the exposure device 13. The PWM signal is input to the laser driver 409. The laser driver 409 controls the light emission of the semiconductor laser 410 in accordance with the PWM signal.

Adjustment of Characteristics of Image Forming Apparatus

The image forming apparatus 100 can perform quality adjustment of the characteristics (printing condition) of the printer 300 and image diagnosis on an image with the use of a test chart. The image forming apparatus 100 reads a test chart with the reader 200, and performs characteristics adjustment and image diagnosis based on the result of the reading. Through characteristics adjustment, a plurality of types of printing conditions, for example, tone correction, density unevenness, printing position, and transfer output (a secondary transfer voltage) are adjusted. Through image diagnosis, an image is diagnosed for image failures, for example, point image/streaked image, and double-side reading color correction. The test chart includes a test image that corresponds to the types of characteristics adjustment and image diagnosis.

In this embodiment, the tone correction, and the density unevenness correction, which are typical adjustment functions, will be described. However, the present invention is not limited to these two adjustment functions, and is applicable to an adjustment function performed based on a result of reading the test chart by the reader 200.

Tone Correction

Tone correction is executed in a case where reproducibility of the density or hue of an image formed by the printer 300 drops. To execute tone correction, a test chart for tone correction, which is printed by the printer 300, is read with the reader 200 and the LUTa and the LUTb for correcting density characteristics (γ characteristics) is created based on the result of the reading.

Figure 5:
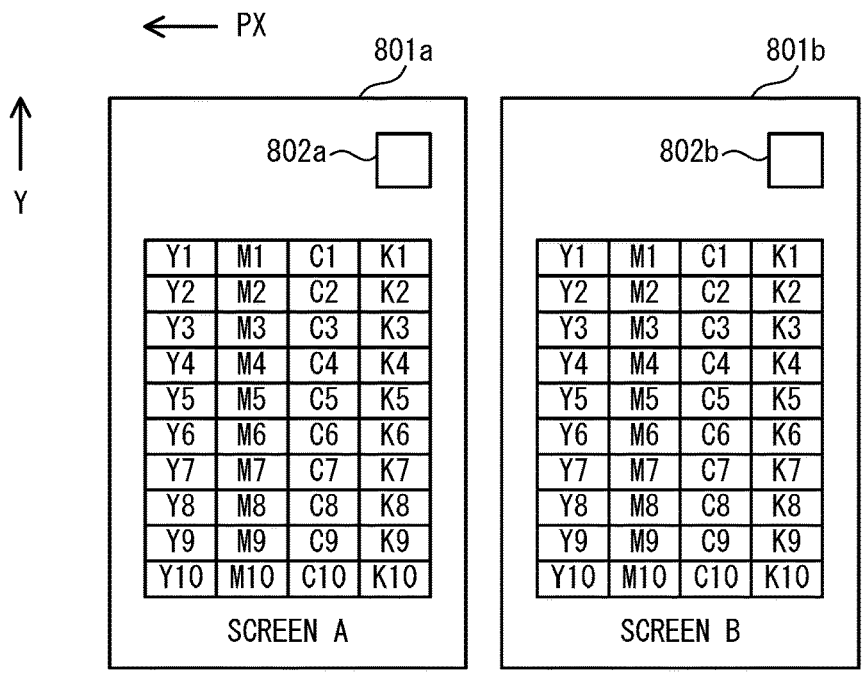
FIG. 5 is an exemplary illustration of test charts for use in tone correction.

FIG. 5 is an exemplary illustration of test charts for use in the tone correction. Each of test charts 801a and 801b includes test images formed of 10 tones for each color of Y, M, C, and K, and judgment marks 802a, 802b indicating that the chart is the test chart 801a, 801b used for tone correction, respectively. The judgment mark 802a is formed by a 100%-density signal of magenta. The judgment mark 802b is formed by a 100%-density signal of cyan.

For each color, for example, test images of 10 tones are formed of density signals of 10%, 20%, 30%, 40%, 50%, 60%, 70%, 80%, 90%, and 100%. The dither processor 407 can apply a plurality of procedures of halftone processing. For example, the dither processor 407 includes a small number-of-line screen (160 lines per each (lpi) to 180 lpi) and a large number-of-line screen (250 lpi to 300 lpi). The test chart 801a is a test chart to which the small number-of-line screen is applied. The test chart 801b is a test chart to which the large number-of-line screen is applied. The small number-of-line screen is applied to printing processing, and the large number-of-line screen is applied to copying processing. In a case where the printer 300 can form an image with three types or more of the number of lines, the number of the types of test charts may also be three or more. Here, the number of test charts formed in a case where tone correction is executed is two for the sake of convenience of description.

Figure 6:
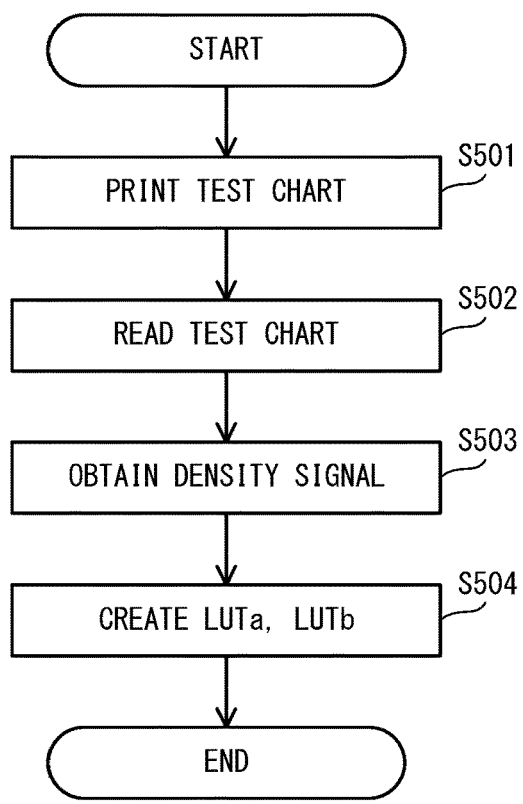
FIG. 6 is a flow chart for illustrating tone correction processing.

FIG. 6 is a flow chart representing a tone correction process. The CPU 401 sets a print condition to the printer 300, and the printer 300 continuously prints the test charts 801a and 801b for tone correction illustrated in FIG. 5 (Step S501). Therefore, the CPU 401 transmits the density signal of the test image included in the test charts to the dither processor 407. At this time, LUTa and LUTb are not used.

After the test chart is printed, the CPU 401 reads the test chart with the reader 200 through processing corresponding to the reading mode (Step S502). When the user inputs an instruction to start reading using the operation unit 400, the CPU 401 controls the reader 200 to read the test chart. The test chart is read in ADF reading (first reading mode) or platen reading (second reading mode). The reader image processor 108 transmits a luminance signal which represents a reading result of the test chart, to the printer controller 109.

The CPU 401 obtains the density signals of the test image based on the reading result (luminance signals) (Step S503). The CPU 401 converts the luminance signals into the density signals with the use of the LUTid 404 of the color processor 403. Thus, a density signal for each of the images of 10 tones is obtained. The CPU 401 may switch the tables of the LUTid 404 of the color processor 403 depending on the type of the sheet for use in the test chart.

The CPU 401 creates the LUTa and LUTb based on the density signals used to create the test image and the density signals obtained from the reading result of the test chart (Step S504). The CPU 401 stores the created LUTa and LUTb in the memory 402. The tone correction processing is performed as described above.

Density Unevenness Correction

Density unevenness correction is executed in order to correct unevenness in image density within an area of the sheet P in which an image is formed. Density unevenness in the main scanning direction (Y-direction) of the printer 300 is caused by, for example, charge unevenness due to deterioration of the charger 12 configured to charge surfaces of the photosensitive drums 11, exposure unevenness of laser light by the exposure device 13, or development unevenness by the developing device 14.

Figure 7A:
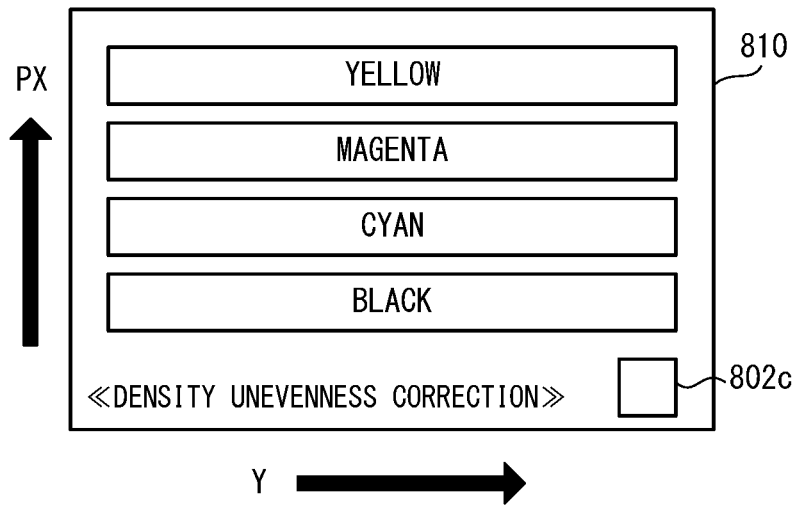
FIGS. 7A and 7B are exemplary illustrations of test charts for use in tone correction.
Figure 7B:
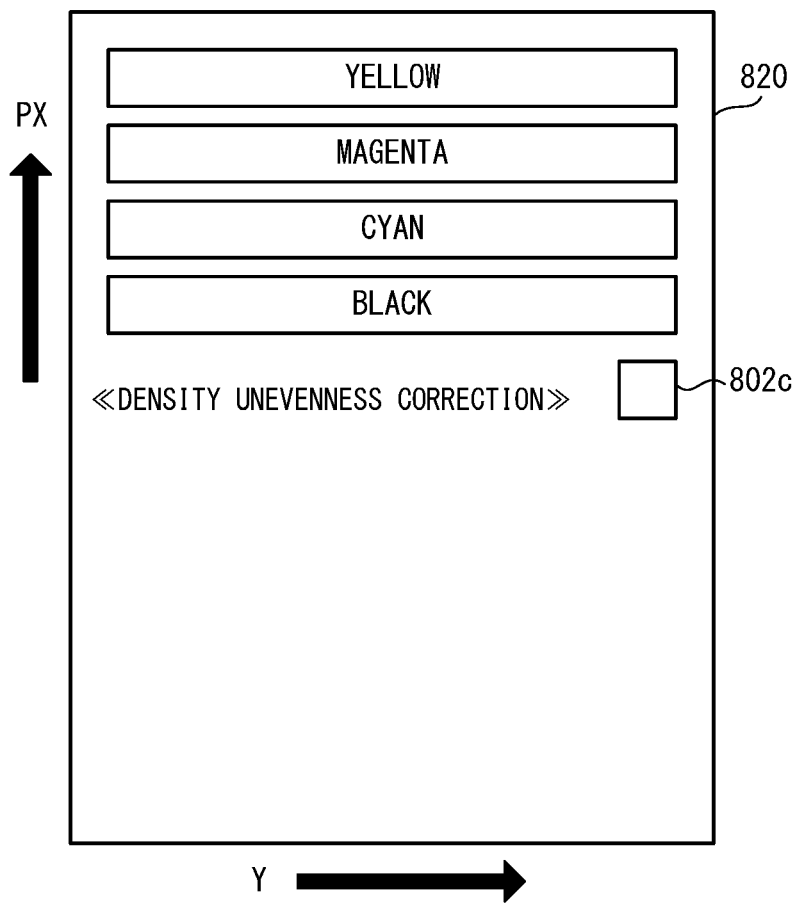

In the case of correcting such density unevenness in the main scanning direction, a test chart for density unevenness correction is printed. FIG. 7A and FIG. 7B are explanatory diagrams of test charts for density unevenness correction. In FIG. 7A, an example of a test chart 810 for the A4 size is illustrated. In FIG. 7B, an example of a test chart 820 for the A3 size is illustrated. In each of the test charts 810 and 820, band-shaped test images in the colors yellow, magenta, cyan, and black, respectively, are formed from 50%-density signals of each color in the main scanning direction (Y-direction). The band-shaped test images are formed so that a longitudinal direction of the bands is the main scanning direction, regardless of the sheet size. Further, the test charts 810 and 820 include a judgment mark 802c indicating that the test chart is for adjusting the density unevenness. The judgment mark 802c is formed from a 100%-density signal of yellow.

The test charts 810 and 820 for density unevenness correction are recommended to be read with the test charts 810 and 820 set so that the main scanning direction (Y-direction) of the test charts 810 and 810 is parallel to the SX1-direction or SX2-direction of the reader 200. This is because the image sensor 105 includes photoelectric conversion elements arrayed linearly side by side in the main scanning direction, and characteristics of the photoelectric conversion elements differ depending on positions of the photoelectric conversion elements in the Y-direction. The reader 200 can reduce differences in characteristics due to the positions of the photoelectric conversion elements of the image sensor 105 by reading the test charts 810 and 820 with the main scanning direction of the test charts 810 and 820 set along the SX1-direction or SX2-direction of the reader 200. The reading direction of the test charts 810 and 820 for density unevenness correction is not required to be limited in a case where the influence of the differences in characteristics due to the positions of the photoelectric conversion elements of the image sensor 105 is small.

The density unevenness is corrected by performing feedback correction of the amount of exposure with laser light in the main scanning direction (Y-direction) so as to cancel out density unevenness in the main scanning direction (Y-direction) that is detected from the result of reading the test charts 810 and 820 for density unevenness correction. The test charts 810, 820 for density unevenness correction are read with the reader 200 by ADF reading (the first reading mode) or platen reading (the second reading mode) as in tone correction.

Adjustment Operation

When the image forming apparatus 100 adjusts the characteristics (printing conditions) of the printer 300 and performs the image diagnosis using the test chart, the image forming apparatus 100 determines whether to perform ADF reading (first reading mode) or platen reading (second reading mode) after printing the test chart. The CPU 401 of the image forming apparatus 100 can automatically make this determination based on whether the test chart is placed on the platen 102 or the original tray 302 of the ADF 220. As described above, as to the original placed on the platen 102 or the original tray 302, its original size can be detected. Using this function, the CPU 401 can determine that the one on which the original size is detected is the one on which the test chart (document) is placed. The CPU 401 determines to perform the ADF reading (first reading mode) in a case where the test chart is placed on the original tray 302, and determines to perform the platen reading (second reading mode) in a case where the test chart is placed on the platen 102. Thus, the user need not to select the placement position of the test chart.

Figure 8:
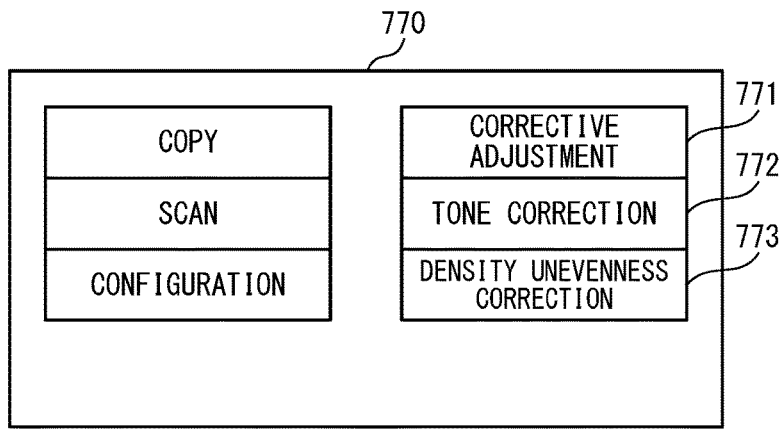
FIG. 8 is an explanatory diagram of an operation screen for setting processing for an image forming apparatus.

FIG. 8 is an exemplary illustration of an operation screen for setting a process of the image forming apparatus 100. This operation screen 770 is displayed on a display of the operation unit 400. The user can instruct, by selecting a button displayed on the operation screen 770 through the operation unit 400, the image forming apparatus 100 to execute processing that is associated with the button.

In a case where a corrective adjustment button 771 on the operation screen 770 is selected, what is displayed on the display of the operation unit 400 is switched to an execution reception operation screen for receiving the execution of correcting adjustment. In a case where a tone correction button 772 or a density unevenness correction button 773 on the operation screen 770 is selected, what is displayed on the display of the operation unit 400 is switched to an operation screen for separately executing tone correction or geometric characteristics adjustment by the method described above.

The user selects the tone correction button 772 or the density unevenness correction button 773 to select a type of the sheet on which the test chart is printed. Thus, the CPU 401 can print the test chart and make selected adjustments based on the reading result of the test chart by the reader 200. When the corrective adjustment button 771 is selected by the user, the CPU 401 continuously prints the test chart for the tone correction and the test chart for density unevenness adjustment, and continuously reads each of the test charts by the reader 200. Thus, two adjustments, i.e., the tone correction and the density unevenness correction, are performed at once.

Figure 9:
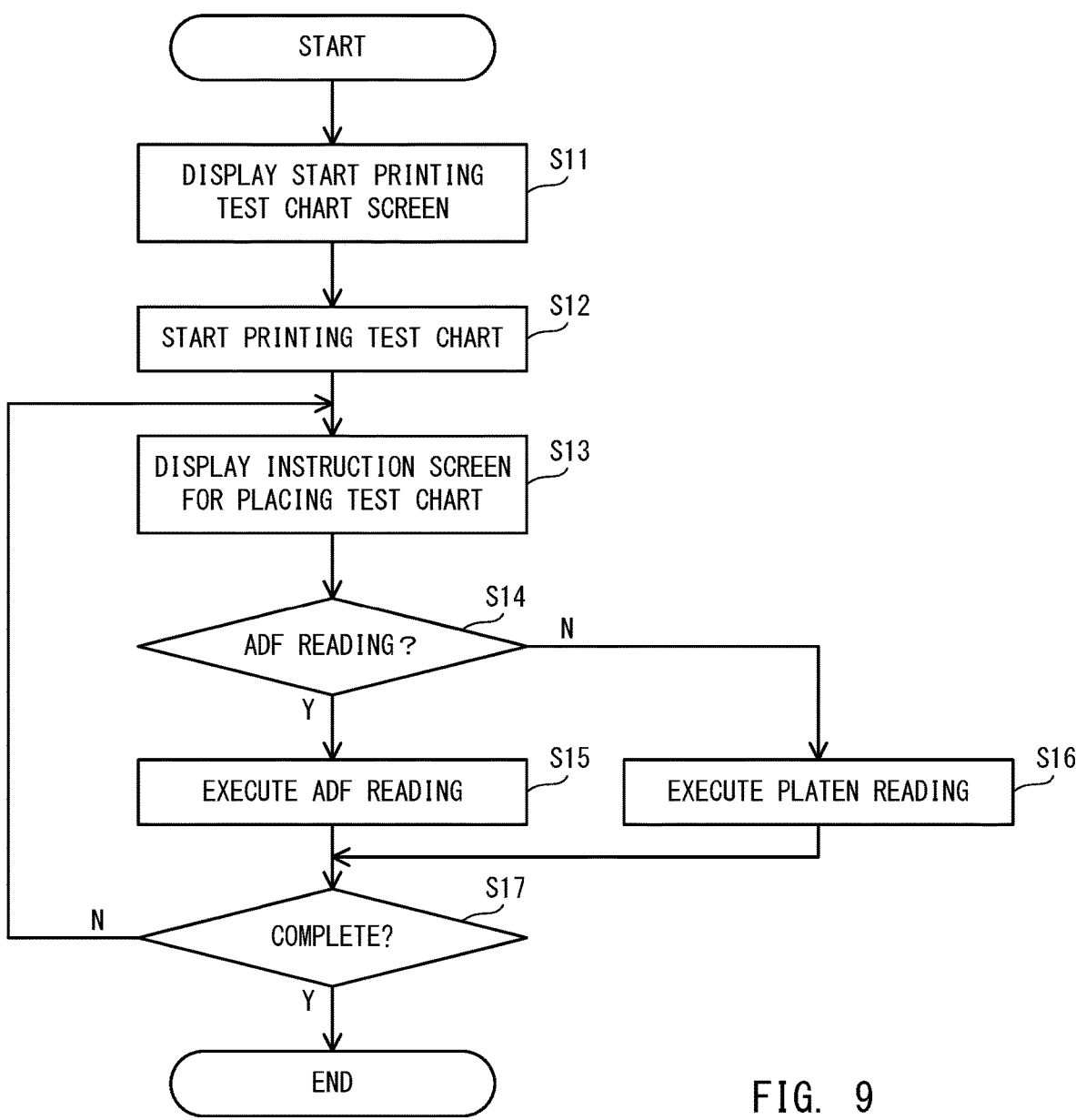
FIG. 9 is a flow chart representing a reading process of a test chart.
Figure 10A:
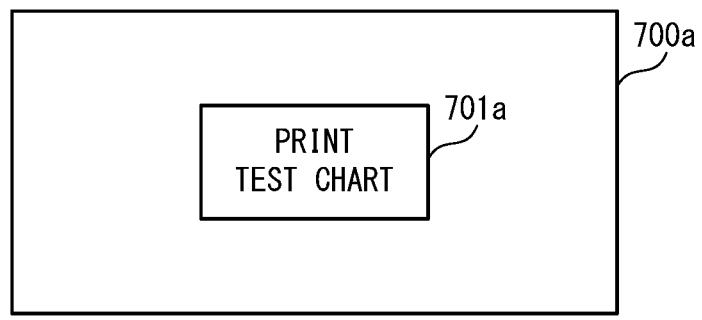
FIG. 10A, FIG. 10B, and FIG. 10C are operation screens displayed during the reading processing of the test chart.
Figure 10B:
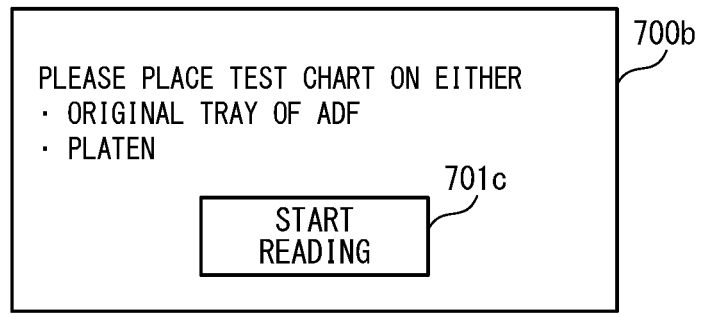
Figure 10C:
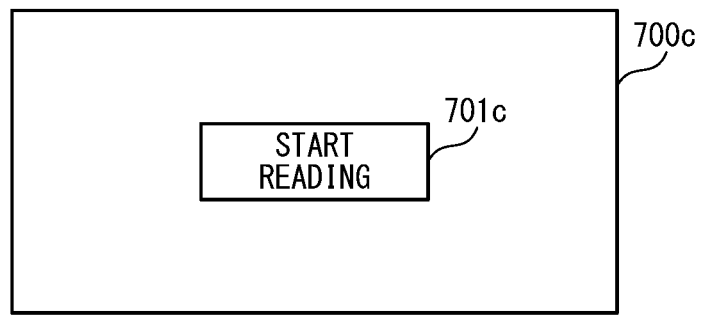

FIG. 9 is a flowchart representing the reading process of the test chart at the time of adjustment. FIG. 10A to FIG. 10C are exemplary diagrams of an operation screen displayed on a display of the operation unit 400 during the reading process of the test chart. This process is started in a case where the user instructs a content of the adjustment through the operation screen 770 of FIG. 8 displayed on the display of the operation unit 400.

When the type of the sheet to be used for the test chart is selected after the content of the adjustment is selected using the operation screen 770, the CPU 401 displays an operation screen 700a shown in FIG. 10A on the display of the operation unit 400 (Step S11). The operation screen 700a is a screen for prompting the user to start printing the test chart. On the operation screen 700a, a button 701a for instructing the start of printing of the test chart is displayed. When the user presses the button 701a through the operation unit 400, the CPU 401 receives a print start instruction of the test chart.

When the CPU 401 receives the print start instruction of the test chart, the CPU 401 starts printing the test chart (Step S12). In a case where there are two or more test charts, the test charts are continuously printed. After the test chart is printed on the sheet, the CPU 401 displays an operation screen 700b shown in FIG. 10B on the display of the operation unit 400 (Step S13). This operation screen 700b is a screen for prompting the user to place the test chart. The operation screen 700b prompts the user to place the test chart on either the original tray 302 of the ADF 220 or the platen 102.

The user places the test chart on either the original tray 302 or the platen 102 according to the operation screen 700b. The CPU 401 determines whether or not to perform the ADF reading based on the position where the test chart is placed (Step S14). When the test chart is placed on the original tray 302, the CPU 401 detects the size of the test chart by the method for detecting the document size on the original tray 302 described above to thereby detect that the test chart is placed on the original tray 302. The CPU 401 determines that the ADF reading is to be performed because the test chart is placed on the original tray 302. When the test chart is placed on the platen 102, the CPU 401 detects the size of the test chart by the method for detecting the document size on the platen 102 described above to thereby detect that the test chart is placed on the platen 102. The CPU 401 determines that the platen reading is to be performed because the test chart is placed on the platen 102.

When the test chart is placed on either the original tray 302 or the platen 102, the CPU 401 displays an operation screen 700c shown in FIG. 10C on the display of the operation unit 400. On the operation screen 700c, a button 701c for instructing the start of reading the test chart is displayed to prompt the user to instruct the start of reading the test chart. When the user presses the button 701c using the operation unit 400, the CPU 401 receives a reading start instruction of the test chart. In the present embodiment, the same operation screen 700c is displayed in a case where the test chart is placed on the original tray 302 and in a case where the test chart is placed on the platen 102. However, the operation screen 700c may be a different screen for each case.

When performing the ADF reading (Step S14: Y), upon receiving the reading start instruction of the test chart, the CPU 401 operates in the first reading mode and executes the ADF reading of the test chart (Step S15). In a case where there are two or more test charts, the CPU 401 continuously performs the ADF reading of the test chart. When performing the platen reading (Step S14: N), upon receiving the reading start instruction of the test chart, the CPU 401 operates in the second reading mode and executes the platen reading of the test chart (Step S16). In a case where a plurality of the test charts can be placed on the platen 102, the CPU 401 may collectively read the plurality of the test charts on the platen 102 by the platen reading. As to the two or more test charts, each test chart has a different identification mark. Thereby, for example, when the tone correction is executed in the second reading mode, the CPU 401 can appropriately determine a reading result of each test chart from a reading result obtained in the second reading mode.

After reading the test chart, the CPU 401 determines whether or not all test charts have been completely read or not (Step S17). In a case where the reading is not completed (Step S17: N), the CPU 401 displays the operation screen 700b shown in FIG. 10B on the display of the operation unit 400, and repeats the processes after S13 until the reading is completed. When the reading is completed (Step S17: Y), the CPU 401 ends the reading process of the test chart. The CPU 401 adjusts various print conditions based on the reading result of the test chart.

Figure 11:
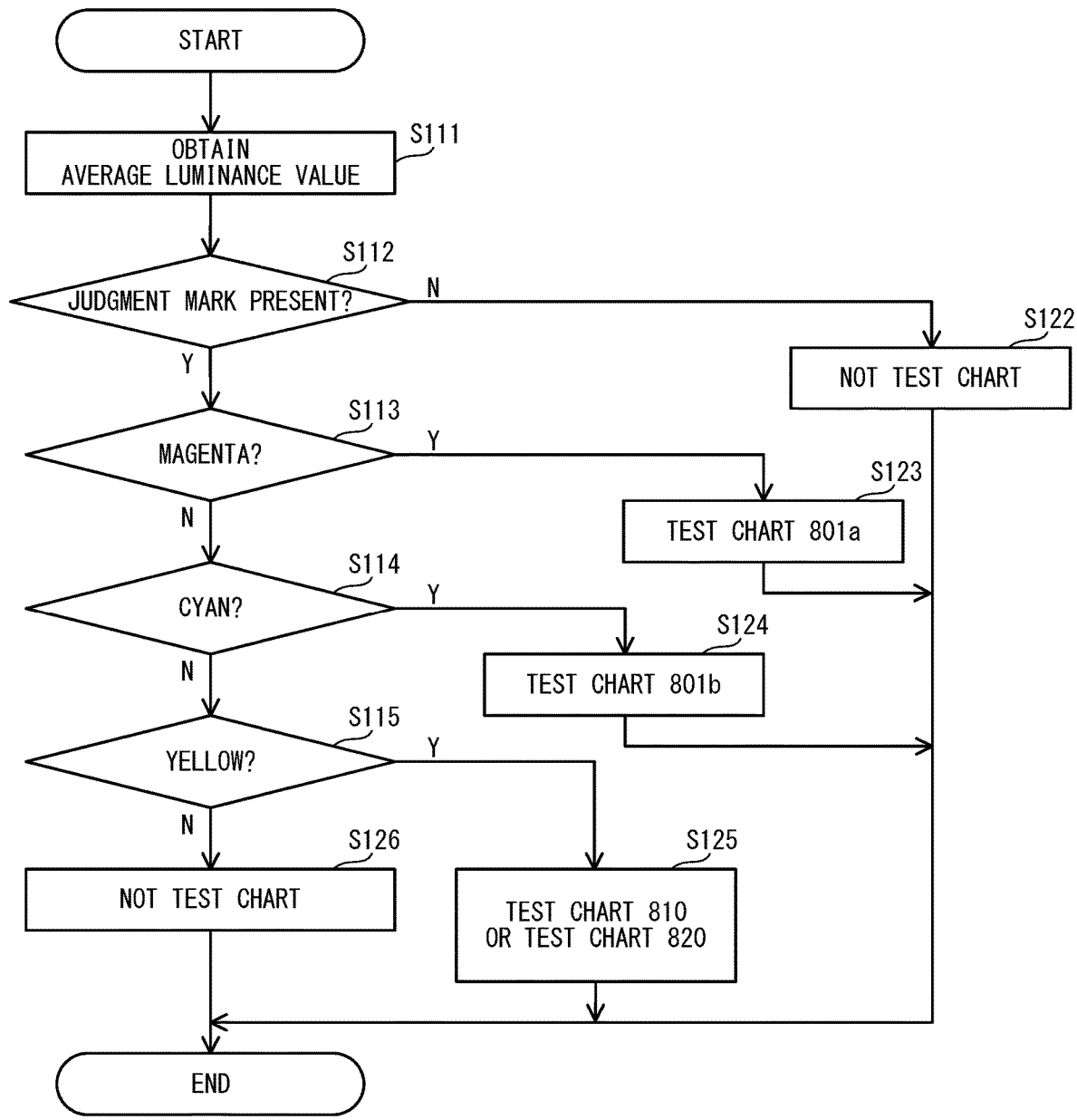
FIG. 11 is a flow chart representing processing for deciding a type of the test chart.

FIG. 11 is a flowchart representing a determination process for determining the type of the test chart from the reading result for each read sheet. In the reading completion determination process of the test chart in Step S17, the CPU 401 performs a determination flow for determining the type of the test chart for all of the read sheets, and determines whether or not all of the test charts have been read. In this process, the type of the test chart is determined using the judgment marks 802a, 802b, and 802c. As described with reference to FIG. 5, FIG. 7A and FIG. 7B, the judgment mark is formed on the test chart. The color of the judgment mark differs depending on the type of the test chart. As described above, as to the test chart 801a for the tone correction of the small number-of-line screen, the judgment mark 802a is formed with the 100%-density signal of magenta. In the test chart 801b for the tone correction of a large number-of-line screen, a judgment mark 802b is formed by a 100%-density signal of cyan. In the test charts 810 and 820 for the density unevenness correction, a judgment mark 802c is formed by a 100%-density signal of yellow.

The CPU 401 obtains an average value (average luminance value (Rm, Gm, Bm)) of a luminance signal of the judgment marks from the reading result of the test chart read by the reader 200 (Step S111). Rm is an average brightness value of red. Gm is an average brightness value of green. Bm is an average brightness value of blue. The CPU 401 determines presence or absence of the judgment mark based on the obtained average luminance value (Step S112). The CPU 401 determines that the judgment mark is present, for example, when the average luminance value is equal to or less than a predetermined luminance value. In the present embodiment, the predetermined luminance value is set to be 150. The CPU 401 determines the presence or absence of the judgment mark depending on whether or not at least one of the conditions of Rm≤150, Gm≤150, or Bm≤150 is met.

In a case where no judgment mark is found (Step S112: N), the CPU 401 determines that the read sheet is not the test chart (Step S122). In a case where the judgment mark is present (Step S112: Y), the CPU 401 determines whether or not the judgment mark is magenta or not (Step S113). The CPU 401 makes this determination based on a result of comparison between the average luminance value Rm, the average luminance value Gm, and the predetermined luminance value. For example, the CPU 401 determines that the read judgment mark is magenta when the condition of "96≤Rm and Gm≤80" is met.

When the judgment mark is magenta (Step S113: Y), the CPU 401 determines that the read test chart is the test chart 801a for the tone correction of the small number-of-line screen (Step S123). When the judgment mark is not magenta (Step S113: N), the CPU 401 determines whether or not the judgment mark is cyan or not (Step S114). The CPU 401 makes this determination based on the result of comparison between the average luminance value Rm, the average luminance value Bm, and the predetermined luminance value. For example, the CPU 401 determines that the read judgment mark is cyan when the condition of "Rm≤80 and 96≤Bm" is met.

When the judgment mark is cyan (Step S114: Y), the CPU 401 determines that the read test chart is the test chart 801b for the tone correction of the large number-of-line screen (Step S124). When the judgment mark is not cyan (Step S114: N), the CPU 401 determines whether or not the judgment mark is yellow or not (Step S115). The CPU 401 makes this determination based on the result of comparison between the average luminance value Gm and the average luminance value Bm, and the predetermined luminance value. For example, the CPU 401 determines that the read judgment mark is yellow when the condition of "96≤Gm and Bm≤80" is met.

When the judgment mark is yellow (Step S115: Y), the CPU 401 determines that the read test chart is the test chart 810 or the test chart 820 for adjusting the density unevenness correction (Step S125). In a case where the judgment mark is not yellow (Step S115: N), the CPU 401 determines that the read sheet is not the test chart (Step S122).

In the image forming apparatus 100 of the present embodiment as described above, a reading mode (reading method) of the test chart can be selected by the user after printing the test chart. Conventionally, before printing the test chart, the reading mode must be determined to be either "ADF reading" or "platen reading". Therefore, the user uses the operation unit 400 to select the reading mode before instructing to print the test chart. In addition, since the reading mode cannot be changed after printing the test chart in the prior art, it is necessary to print the test chart again when changing the reading mode.

The image forming apparatus according to the present embodiment has improved convenience because the reading mode of the test chart is selected after the user instructs the printing of the test chart. The reading mode is selected by the user placing the test chart on either the original tray 302 or the platen 102. Therefore, workability is improved since the user does not need to select the reading mode by the operation unit 400. In addition, since the reading mode can be selected even after printing the test chart, the printing conditions can be adjusted in the reading mode which is selected according to an installation environment of the image forming apparatus 100, a sheet size of the test chart, user's work preference, and the like.

Selection of Reading Mode

In the above example, the image forming apparatus 100 automatically determines the reading mode as the ADF reading or the platen reading based on the method of detecting the size of the test chart. However, in a case where a sheet other than the test chart such as an original is previously placed on the platen 102 or the original tray 302, the reading mode may be determined by reading result of this sheet.

In addition, reading of a plurality of the test charts may be performed in different reading modes. For example, in a case where the test chart for the tone correction and the test chart for the density unevenness correction are printed together, the test chart for the tone correction may be placed on the original tray 302 and the test chart for the density unevenness correction may be placed on the platen 102. The test chart for the density unevenness correction is placed so that the main scanning direction (Y-direction) is parallel to an SX1-direction of the platen 102 in order to correct the density unevenness with high accuracy. In this case, since the test chart is placed on both of the original tray 302 and the platen 102, the CPU 401 cannot determine the reading mode. In addition, the reader 200 of the image forming apparatus 100 may not have a size detection function for the test chart, thus it may not be possible to automatically determine whether the test chart is placed for the ADF reading or for the platen reading. In this case, the user must determine whether the test chart is placed for the ADF reading or for the platen reading.

Figure 12:
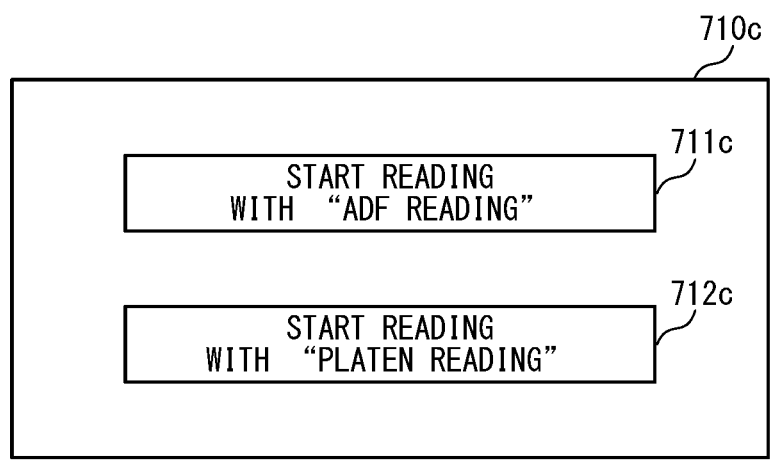
FIG. 12 is an explanatory diagram of a selection screen of a reading mode.

Therefore, it is possible to make the reading mode to be selectable when the user instructs the start of reading the test chart. FIG. 12 is an exemplary diagram of a reading mode selection screen. The selection screen 710c includes buttons 711c and 712c to instruct the start of reading in the two reading modes. In a case where the button 711c is pressed, the start of reading the test chart by ADF reading is instructed. In a case where the button 712c is pressed, the start of reading the test chart by platen reading is instructed. Further, the selection screen 710c may be configured to display a message prompting the user to place the test chart on either the original tray 302 of the ADF 220 or the platen 102.

The user selects either the button 711c or button the 712c, and presses the selected button displayed on the operation unit 400. The selection screen 710c is displayed on the display of the operation unit 400 during the processing of Step S14 in the flowchart of FIG. 9. That is, after the test chart is placed and the size of the test chart is detected, the CPU 401 displays, after the determination process for determining the position where the test chart is placed, the selection screen 710c on the display of the operation unit 400. The CPU 401 obtains the reading start instruction corresponding to the button pressed by the operation unit 400 and reads the test chart.

The CPU 401 is prevented from starting to read the test chart when the test chart is not placed. Therefore, it is possible to prevent the test chart from being read incorrectly. In a case where the test chart is placed on each of the original tray 302 and the platen 102, the user can continuously instruct ADF reading and platen reading by pressing the buttons 711c and 712c of the selection screen 710c. Therefore, the CPU 401 can continuously perform ADF reading and platen reading.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-207042, filed Dec. 14, 2020, which is hereby incorporated by reference herein in its entirety.

What is claimed is:

1. An image forming apparatus comprising:
   a printer configured to print an image on a sheet;
   a reader including:
      a platen on which a document is to be placed;
      an indicator to indicate how to place a sheet on the platen;
      a reading sensor configured to read an image of the document placed on the platen; and
      a first sheet detector configured to detect a sheet on the platen, the first sheet detector arranged at a detection position where, as to the sheet placed on the platen according to the indicator, a sheet whose length in a longitudinal direction of the platen is greater than or equal to a predetermined length is detected and a sheet whose length in the longitudinal direction of the platen is less than the predetermined length is not detected;
   a document feeder rotatably supported by the reader including:
      a stacking tray on which a document is to be stacked;
      a conveyance roller configured to convey the document stacked on the stacking tray to cause the reading sensor to read an image of the document; and
      a discharge tray on which the document conveyed by the conveyance roller is discharged; and
      a second sheet detector configured to detect a sheet on the stacking tray, and
   at least one processor configured to:
      receive user instruction information for instructing to print a test chart, wherein the printer is configured to form, based on the user instruction information, the test chart on a sheet having a size greater than a predetermined size, with the sheet having a size greater than a predetermined size being a sheet whose length in the longitudinal direction of the platen is, in a case where the sheet is placed on the platen according to the indicator, greater than or equal to the predetermined length;
      control the reading sensor to read an image on the sheet on the platen in a case where the sheet on which the test chart has been formed is detected by the first sheet detector and is not detected by the second sheet detector and a user instruction for reading the test chart by the reader is received; and
      control the conveyance roller to convey the sheet on which the test chart has been formed to control the reading sensor to read an image on the sheet in a case where the sheet on which the test chart has been formed is detected by the second sheet detector and is not detected by the first sheet detector and a user instruction for reading the test chart by the reader is received.

2. The image forming apparatus according to claim 1, wherein the at least one processor includes an image processor configured to correct an image signal based on a tone correction condition, and
   wherein the at least one processor generates the tone correction condition based on the reading result of the test chart read by the reading sensor.

3. The image forming apparatus according to claim 1, wherein the at least one processor is configured to control unevenness in density of the image to be printed by the printer based on the reading result of the test chart read by the reading sensor.

4. The image forming apparatus according to claim 1, wherein the at least one processor is configured to control the display to display a guidance screen, the guidance screen having both a message for prompting to stack the sheet on which the test chart is formed on the stacking tray and a message for prompting to place the sheet on which the test chart is formed on the platen.

5. The image forming apparatus according to claim 1, wherein the at least one processor is configured to control tone characteristics of an image to be formed by the printer based on the reading result of the test chart read by the reading sensor.

6. The image forming apparatus according to claim 1, wherein the at least one processor is configured to control a print position of an image to be formed by the printer based on the reading result of the test chart read by the reading sensor.

7. The image forming apparatus according to claim 1, wherein the second sheet detector detects a length of the sheet on the stacking tray.

8. The image forming apparatus according to claim 1, wherein the at least one processor is configured to detect the size of the sheet on the platen based on a reading result of the reading sensor and a detection result of the first sheet detector.

9. The image forming apparatus according to claim 1, further comprising:
   a regulating member configured to slide in a width direction perpendicular to a feeding direction in which a document on the stacking tray is fed; and
   a sensor configured to detect a position of the regulating member;
   wherein the at least one processor is configured to detect a size of a sheet on the stacking tray based on a detection result of the second detector and a detection result of the sensor.

10. The image forming apparatus according to claim 1, wherein the indicator includes a mark to be used for registration of an original and an indication which serves as a guidance for a size of the original in a case where the original is placed on the platen.

11. The image forming apparatus according to claim 1,
wherein the detection position is a position where a sheet having an A4 size on the platen is not detected in a case where a long side of the sheet having the A4 size abuts against a first abutment portion of the reader and a short side of the sheet having the A4 size abuts against a second abutment portion of the reader, and
wherein the detection position is a position where a sheet having an A3 size on the platen is detected in a case where a short side of the sheet having the A3 size abuts against the first abutment portion of the reader and a long side of the sheet having the A3 size abuts against the second abutment portion of the reader.

* * * * *